Figure 1:
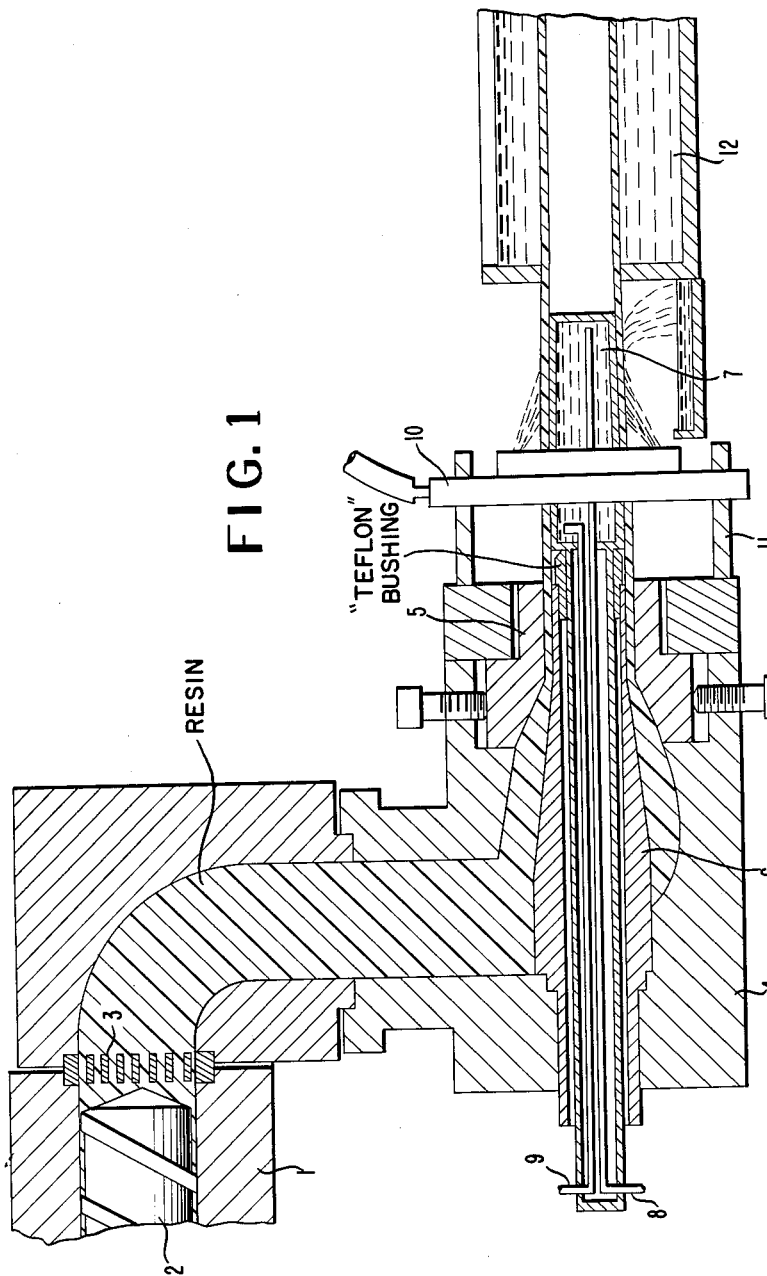

Oct. 9, 1962 H. K. LOVELESS 3,057,013
METHOD FOR PRODUCING PIPE
Filed Feb. 15, 1960 3 Sheets-Sheet 2

INVENTOR

HAROLD KENNETH LOVELESS

BY Bernd W. Sandy

ATTORNEY

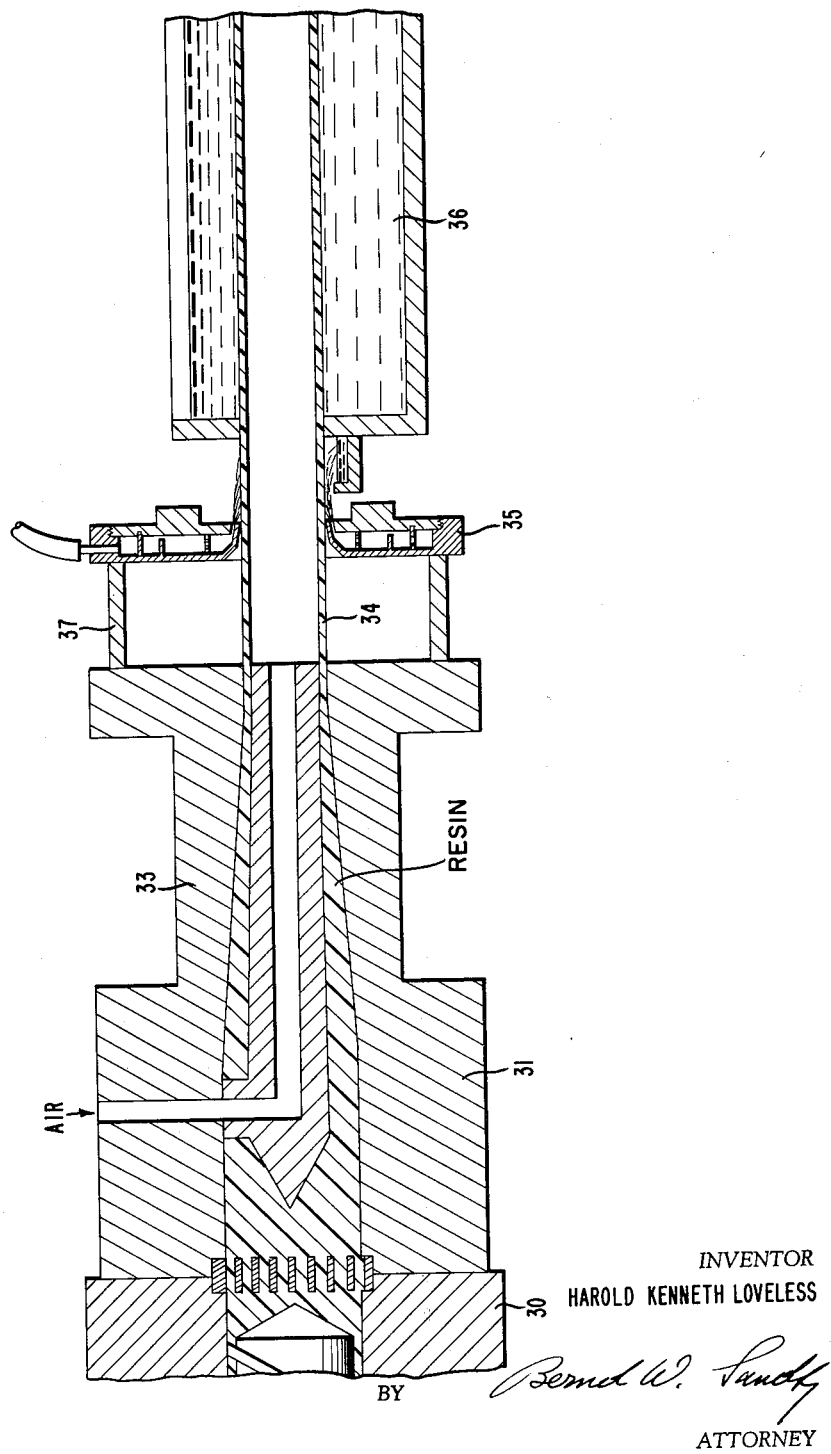

р

United States Patent Office 3,057,013
Patented Oct. 9, 1962

3,057,013
METHOD FOR PRODUCING PIPE
Harold Kenneth Loveless, Wilmington, Del., assignor to E. I. du Pont de Nemours and Company, Wilmington, Del., a corporation of Delaware
Filed Feb. 15, 1960, Ser. No. 8,685
2 Claims. (Cl. 18—55)

This invention relates to the production of pipe from thermoplastic resins. More particularly, it releates to a new and improved pipe extrusion process for the production of self-supporting pipe and tubing.

Thermoplastic resins are commonly formed into uniform tubular shape by extruding the molten thermoplastic from a die having an annular opening. Pipe and tubing so produced is subject to a number of deficiencies such as non-uniform wall thickness, uneven diameter, and rough or non-glossy surfaces. These deficiencies generally result from sagging of the hot thermoplastic pipe and from uneven cooling of the pipe or tube as it emerges from the die orifice. Various means have been devised to overcome these deficiencies in the melt extrusion of pipe from thermoplastic resins. Thus, gaseous and liquid media have been injected into the pipe through the mandrel in the extrusion die or by other means which prevent the pipe from collapsing. Other means used are quenching baths, forming boxes and sizing plates. A more recently developed technique comprises the use of a cold mandrel which is attached to the hot mandrel in the extrusion die, but insulated therefrom, and which cools and shapes the pipe as it emerges from the extrusion die. In order to obtain a smooth and glossy outer surface on the extruded pipe, the pipe is generally quenched by a stream of water or air or passed through a quench tank containing a cooling liquid. Unless such cooling, however, is uniformly applied to the hot, extruded pipe, the improvement resulting from such cooling is minimized as far as the surface properties of the pipe are concerned.

It is accordingly an object of this invention to provide a new and improved extrusion method for the production of self-supporting pipe and tubing. Another object of this invention is to provide a pipe extrusion process whereby smooth surfaced pipe of uniform diameter and wall thickness is produced. Other objects will become apparent hereinafter.

The objects of the present invention are accomplished by passing the pipe, as it emerges from the extrusion die through a water cooling ring which uniformly imparts to the entire circumference of the pipe a conical sheet of water or other cooling liquid at an angle of up to 20°, the conical sheet of water being applied in the direction of the forward moving pipe. By applying such a conical sheet of water to the pipe, as it emerges from the extrusion die, the pipe is uniformly cooled around its entire circumference thereby preventing any sagging of the pipe and variations in diameter or wall thickness of the pipe, as well as giving rise to a smooth and glossy surface without water marks as obtained by the cooling methods disclosed in the prior art. It is essential that the water spray be applied at an angle up to 20° in order to avoid back-splashing of the cooling water and thereby cause spot cooling leading to non-uniformities in the pipe surface. Furthermore, by applying the sheet of water at this angle, the water forms a continuous band around the circumference of the pipe to be cooled, thereby giving rise to extremely uniform cooling. In a preferred embodiment of the present invention, the cooling ring is applied in combination with a cold mandrel extending, but insulated, from the hot mandrel in the extrusion die, causing the pipe to be simultaneously cooled on the inner and the outer surface, and thereby giving rise to pipe of little or no deviation in wall thickness and diameter.

In another embodiment of the present invention, the water cooling ring is combined with a sizing plate. A sizing plate is generally employed to postform the pipe subsequent to extrusion. It generally comprises a metal ring in contact with the pipe; the heated, semi-plastic pipe, under internal pressure, is passed through the ring and thus assumes the shape of the sizing ring. It was found that by constructing a water cooling ring with the bore, through which the pipe passes, having the same geometry as the bore in a sizing plate, such that a uniform band of water is impinged around the circumference of the pipe immediately as the pipe emerges from the inside bore of the ring, a greatly improved glossly and smooth surface is obtained on the pipe. In addition to the improvement in surface properties a more uniform cooling is achieved which results in closer dimensional control.

The process of the present invention and the apparatus used therein will become clearer from the following detailed description of typical embodiments of the present invention made with reference to the accompanying drawing.

In the drawings, FIGURE 1 shows a schematic, partially transverse section of a typical apparatus embodying the invention. Referring to the drawing, a thermoplastic resin is fed into the barrel of the extruder 1, here partially shown, and moved forward by a screw 2 into a heating zone, not shown, where the polymer is molten. The molten polymer passes through a breaker plate and screen pack 3 into the extrusion die 4 where the pipe is formed by passing through the annulus formed by the collar 5 and the hot mandrel 6. As the pipe emerges from the die, it comes into contact with the cold mandrel 7, water cooled through inlet 8 and outlet 9. The hot mandrel is separated from the cold mandrel by a bushing made of polytetrafluoroethylene, commercially available under the tradename "Teflon." The pipe then passes through the water cooling ring 10 without, of course, contacting such. The water ring is attached to the die by guide rods 11 which permit the adjustment of the position of the water ring with respect to the die. A conical sheet of water emerges from the water cooling ring and hits the pipe simultaneously and uniformly around its circumference at an angle of preferably 10 to 20° forming a band around the pipe and thereby cooling it. The length of the water travel along the pipe in the direction of the pipe travel, i.e. the width of the band, can be adjusted by adjusting the water pressure into the ring. The internally and externally cooled pipe is then further quenched in quench tank 12, assuring complete solidification of the pipe.

Figure 2:
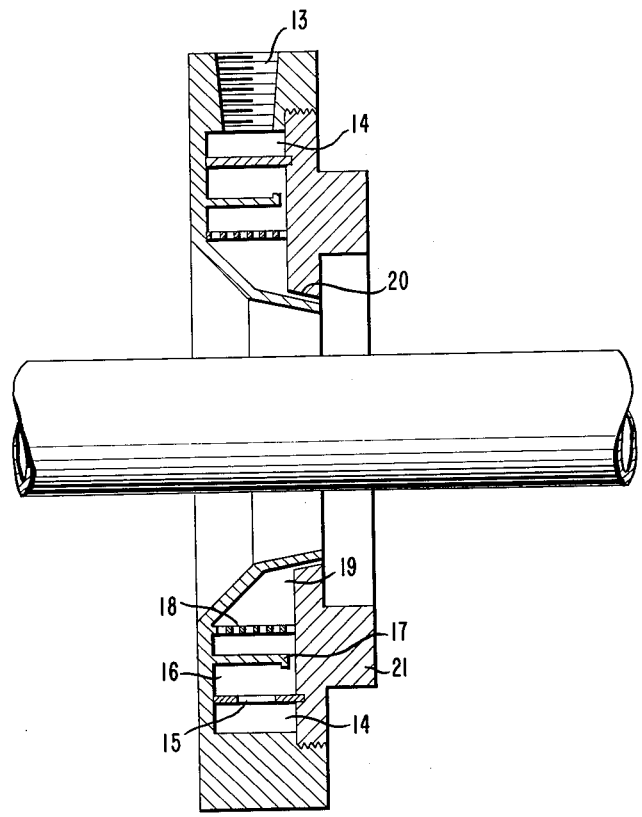

FIGURE 2 is a vertical section through the water cooling ring illustrated schematically in FIGURE 1. Cooling water enters the water cooling ring through opening 13 and circulates through the ring in the annular feed channel 14. The water distributor ring 15 contains three openings placed 120° apart. The cooling water passes through the openings from the annular feed channel into the baffle chamber 16. The water passes by the baffle ring 17 and through the perforated ring 18 into the exit chamber 19 and is formed into a conical sheet of water by the exit nozzle 20 which directs the water at the pipe at an angle of 10 to 20°. The baffle 17 is attached to the cooling ring body, whereas the water distributor ring 15 and the perforated plate 18 are attached to the cooling ring insert 21 which may be employed to adjust the opening of the nozzle thereby adjusting the cooling water pressure. As shown in the drawing, the pipe does not contact the cooling ring in any way.

Another embodiment of the present invention is shown in the schematically drawn section in FIGURE 3. In the process illustrated by FIGURE 3, the molten polymer passes from the extruder 30 into a pipe die 31 equipped with a hot mandrel 32 which contains an air channel 33 by which air is fed into the extruding pipe 34 to maintain an internal pressure on the pipe, the extruded end of the pipe being closed off. The heated, semi-plastic pipe then contacts the water sizing ring 35 where the combination of the internal pressure in the pipe and the sizing ring give the pipe its final shape as it passes through the sizing ring. A continuous circumferential stream of water is formed around the pipe adjacent to and subsequent to the sizing ring, cooling the pipe and imparting to the pipe an improved and highly glossy surface and superior dimensional control. From the sizing ring the pipe passes into a quench tank 36 where the remaining cooling necessary to solidify all of the pipe resin is carried out. The water sizing ring is essentially of the same construction as illustrated in FIGURE 2 except that the nozzle of the water ring also forms the sizing ring, giving the pipe its final outer shape. Again, the sizing plate with the water ring is attached to guide rods which allow adjustment of the sizing plate with respect to the die. When the water ring is used in combination with a sizing plate, the contact angle of the water with the pipe can be extended to about 45°.

Principally, the water-cooling ring of the present invention is constructed in such a manner as to assure an even flow of water around the entire orifice, thereby forming a continuous conical sheet of water which contacts the extruded pipe simultaneously around its entire circumference at an angle of preferably 10 to 20°. The water pressure employed will vary with the type of thermoplastic resin extruded, the extrusion temperature, and the rate of extrusion. The pressure should be sufficient to form a continuous sheet of water around the pipe, but should not be so high as to leave water marks on the surface of the pipe. The water stream is adjusted by the water pressure, the nozzle clearance, the baffle ring clearing, and the number and sizes of holes in the perforator plate and in the feed ring. Although the cooling ring is principally designed to cool the extruded pipe with water, other cooling media may be similarly employed.

The extrusion of the pipe itself may conveniently be carried out with extruders and dies commonly employed in extrusion processes. The process of the present invention is suitable for the extrusion of such thermoplastic polymers as polyethylene, both of the high and low density type polypropylene, polystyrene, polyamides, polycarbonates, polyoxymethylene, polyvinyl chloride, polyvinylidene fluoride, polymethyl methacrylate, polychlorotrifluoroethylene, cellulose acetate and cellulose acetate butyrate. The thermoplastic resins which can be employed in the present invention may be modified by the incorporation therein of plasticizers, fillers, heat stabilizers, antioxidants and pigments.

By using the process of the present invention it was found that in the extrusion of 1 inch O.D. pipe having a wall thickness of 0.125 inch from polyethylene deviations of less than 2 mil in wall thickness were obtained, whereas in the absence of the ring deviations of 5 to 7 mils were obtained. Improvements in surface gloss, apparent to the naked eye, were also obtained by the use of the water cooling ring.

I claim:

1. In the process of extruding a pipe from a thermoplastic resin, wherein the pipe is formed in the molten state by an annular die, the step which comprises cooling said pipe by a converging annular stream of a liquid cooling medium, said stream moving in the same direction as said pipe and simultaneously contacting the pipe around its entire periphery, said stream being at an angle of 10 to 20° to said pipe.

2. The process set forth in claim 1 wherein the cooling medium is water.

References Cited in the file of this patent

UNITED STATES PATENTS

| | | |
|---|---|---|
| 2,245,640 | Beattie | June 17, 1941 |
| 2,546,629 | Brillhart | Mar. 27, 1951 |
| 2,708,772 | Moncrieff | May 24, 1955 |
| 2,770,009 | Rogal et al. | Nov. 13, 1956 |
| 2,814,071 | Allen et al. | Nov. 26, 1957 |
| 2,922,194 | Lampard et al. | Jan. 26, 1960 |
| 2,926,384 | Hertz et al. | Mar. 1, 1960 |
| 2,963,742 | Ahlich et al. | Dec. 13, 1960 |